US006711035B2

(12) United States Patent
Tomioka

(10) Patent No.: US 6,711,035 B2
(45) Date of Patent: Mar. 23, 2004

(54) SWITCHING POWER SUPPLY

(75) Inventor: Satoshi Tomioka, Nagaoka (JP)

(73) Assignee: Densei-Lambda Kabushiki Kaisha (JP)

( * ) Notice: Subject to any disclaimer, the term of this patent is extended or adjusted under 35 U.S.C. 154(b) by 14 days.

(21) Appl. No.: 10/104,079

(22) Filed: Mar. 22, 2002

(65) Prior Publication Data

US 2002/0135342 A1 Sep. 26, 2002

(30) Foreign Application Priority Data

Mar. 23, 2001 (JP) .......................... 2001-085812

(51) Int. Cl.⁷ .......................... H02M 3/335; H02M 3/24
(52) U.S. Cl. .................. 363/21.06; 363/97; 323/282
(58) Field of Search ................ 323/282, 283, 323/284, 285, 286, 287, 288; 363/21.01, 21.06, 21.07, 21.08, 21.09, 21.1, 21.17, 16, 56, 20, 41, 1

(56) References Cited

U.S. PATENT DOCUMENTS 5,631,810 A * 5/1997 Takano ....................... 323/282
5,999,420 A * 12/1999 Aonuma et al. ............... 363/56

FOREIGN PATENT DOCUMENTS

JP         11-285258 A      10/1999
JP         2000-23456 A     1/2000

* cited by examiner

Primary Examiner—Rajnikant B. Patel
(74) Attorney, Agent, or Firm—Akerman Senterfitt

(57) ABSTRACT

A switching power supply which feeds energy stored in a choke coil 7 to a load 11 through a freewheeling element when a switching element 2 turns off. The switching power supply includes a freewheeling MOSFET 6 serving as the freewheeling switch element which operates synchronously with the switching element 2 and a surge voltage prevention circuit 32. The surge voltage prevention circuit 32 detects a timing for a current to flow in the direction that a body diode 16 of the freewheeling MOSFET 6 conducts when an operation stoppage signal to the switching element 2 is outputted, and then turns off the freewheeling MOSFET 6 at the timing.

12 Claims, 5 Drawing Sheets

SWITCHING POWER SUPPLY

BACK GROUND OF THE INVENTION

1. Field of the Invention

The present invention relates to a switching power supply which comprises a synchronous rectifier circuit that rectifies A.C. voltage induced in a secondary winding of a transformer.

2. Description of the Prior Art

FIG. 4 is a general circuit diagram showing a forward converter type switching power supply comprising a conventional synchronous rectifier circuit. In this figure, reference numeral 1 denotes a transformer and 2 a switching element such as a MOSFET. A series circuit of a primary winding 1A of the transformer 1 and the switching element 2 is connected across a D.C. power source 3. Reference numeral 4 denotes a synchronous rectifier circuit connected to a secondary winding 1B of the transformer 1. The synchronous rectifying circuit 4 comprises a rectifying MOSFET 5 (Field Effect Transistor) serving as a rectifying element and a freewheeling MOSFET 6 serving as a freewheeling element, both of which turning on or off synchronously with the switching element 2. A series circuit of a choke coil 7 and a capacitor 8 that are used for smoothing purpose is connected across the freewheeling MOSFET 6. A pair of output terminals 9 and 10 for supplying output voltage Vo is connected across the smoothing capacitor 8. In addition, reference numeral 11 denotes a load connected between the output terminals 9 and 10. Reference numerals 15 and 16 are built-in body diodes, which are connected in parallel with reverse polarity between a drain and a source of the rectifying MOSFET 5 and the freewheeling MOSFET 6, respectively.

A pulse width control circuit 12, corresponding to a control circuit for variably controlling pulse conduction width in accordance with the variation of the output voltage Vo, is provided as a feed back circuit for stabilizing the output voltage Vo. The pulse width control circuit 12 supplies a pulse drive signal to the switching element 2 and also supplies the same to the gate of the rectifying MOSFET 5, inverting the pulse drive signal by an inverter 13 and supplying it to the gate of the freewheeling MOSFET 6. In the meantime, reference numeral 14 denotes an insulating transformer for insulating the pulse width control circuit 12 provided in the primary side of the transformer 1 from the rectifying MOSFET 5 and the freewheeling MOSFET 6 provided in the secondary side thereof.

As a result of the switching operation by the switching element 2, a D.C. voltage Vi from the D.C. power source 3 is applied intermittently to the primary winding 1A of the transformer 1 so that an A.C. voltage induced in the secondary winding 2 of the transformer 1 is rectified by the synchronous rectifying circuit 4, which in turn is smoothed by the choke coil 7 and the smoothing capacitor 8, whereby the D.C. output voltage Vo can be provided across the capacitor 8. More specifically, when the switching element 2 turns on by the ON pulse signal from the pulse width control circuit 12, the ON pulse signal is supplied to the gate of the rectifying MOSFET 5 as it is so that the freewheeling MOSFET 6 turns off by an inverted OFF pulse signal while the rectifying MOSFET 5 turns off. Consequently, energy stored in the secondary winding 1B of the transformer 1 is fed to the choke coil 7 and to the load 11 via the rectifying MOSFET 5. Then, the switching element 2 turns off by the OFF pulse signal from the pulse width control circuit 12 so that the freewheeling MOSFET 6 turns on while the rectifying MOSFET 5 turns off. As the result, the energy that has been stored in the choke coil 7 during the ON period of the switching element 2 is fed to the load 11 via the freewheeling MOSFET 6. In the meantime, the smoothing capacitor 8 is provided for absorbing the ripple component of the output voltage Vo.

FIG. 5 shows waveforms in respective elements of the circuit of FIG. 4, in which the uppermost waveform shows voltage Vgs1 between the gate and the source of the switching element 2, and a waveform immediately therebelow shows voltage Vgs2 between the gate and the source of the rectifying MOSFET 5, and then, voltage Vgs3 between the gate and the source of the freewheeling MOSFET 6, choke current IL flowing through the choke coil 7 in a case where the load current has a greater value than critical current Iv, drain current Idq3 flowing through the freewheeling MOSFET 6 in that case, other choke current IL in the case that I load=0, and other drain current Idq3 flowing through the freewheeling MOSFET 6 in that case, respectively.

As shown by the respective waveforms on the left side of FIG. 5, during the operation of the switching element 2, energy is released from the choke coil 7 during the OFF period of the switching element 2 while it is stored in the choke coil 7 during the ON period thereof so that the choke current IL repeatedly fluctuates up and down the level of the load current I load in the same direction under a normal load other than under no-load or light load. The freewheeling MOSFET 6 at this time does not conduct during the ON period of the switching element 2 and thus the drain current Idq3 becomes zero, while it conducts during the OFF period and thus the drain current Idq3 takes a waveform which is the same as that of said choke current IL.

On the other hand, as the load current I load becomes zero in the case of no load, the choke current IL flowing through the choke coil 7 flows in the reverse direction. Accordingly, the drain current Idq3 flowing through the freewheeling MOSFET 6 during the OFF period of the switching element 2 flows from the source to the drain at first but soon decreases linearly until it becomes zero and then flows in the direction from the drain to the source to increase linearly. When the switching element 2 turns on next so that the freewheeling MOSFET 6 turns off, the drain current Idq3 flowing through the freewheeling MOSFET 6 is kept zero until the switching element 2 turns off again. The above-mentioned actions occur not only for no load but also for light load where the load current is under the critical current Iv.

In the case of no load or light load, if, for example, the D.C. input voltage Vi is turned off or an operation stoppage signal is outputted to the pulse width control circuit 12 when an OFF signal is supplied to ON/OFF control terminal(s), the pulse width control circuit 12 interrupts the operation of the switching element 2 immediately. If the operation stoppage signal is outputted when the drain current Idq3 flowing through the freewheeling MOSFET 6 flows in the direction from the source to the drain (at the time P1 in FIG. 5), the voltage Vgs3 between the gate and the source of the freewheeling MOSFET 6 is turned to zero immediately. In this case, surge voltage does not develop between the drain and the source of the freewheeling MOSFET 6 as the current associated with the discharge of energy stored in the choke coil 7 flows through the body diode 16 of the freewheeling MOSFET 6. However, if the operation stoppage signal is outputted when the drain current Idq3 flowing through the freewheeling MOSFET 6 flows in the direction from the drain to the source (at the time P2 in FIG. 5), then not only the freewheeling MOSFET 6 but also the body diode 16 ceases to conduct. As a result, the energy stored in the choke coil 7 loses its way to flow, so that surge voltage develops. For this reason, such surge voltage, though it depends on cases, may become greater than the withstand voltage of the freewheeling MOSFET 6, and thus there have been the possibilities that it may cause the malfunction of the freewheeling MOSFET 6.

SUMMARY OF THE INVENTION

To eliminate the above-mentioned problems, it is, therefore, an object of the present invention to provide a switching power supply that can prevent a surge voltage from developing when an operation stoppage signal is outputted at the time of no load or light load.

To attain the object, a switching power supply proposed in the present invention is such that energy is supplied to a smoothing choke coil from a secondary winding of a transformer via a rectifier element when a switching element turns on, while the energy stored in the choke coil is fed to a load through a freewheeling switch element when a switching element turns off, in which at least the freewheeling switch element includes a freewheeling switch element which operates synchronously with the switching element, wherein the switching power supply of the invention includes a unidirectional conductible element which is connected in parallel with reverse polarity across the freewheeling switch element and a surge voltage prevention circuit which detects a timing for the current to flow in a direction in which the unidirectional conductible element conducts when the operation stoppage signal to the switching element is outputted, and then turns off the freewheeling switch element at this timing.

In this case, owing to the surge voltage prevention circuit, even if the operation stoppage signal to the switching element is outputted at any timing, yet the freewheeling switch element turns off at such timing that the current flows in the direction in which the unidirectional conductible element conducts, whereby the current following the discharge of the energy stored in the choke coil is allowed to flow through the unidirectional conductible element.

Preferably, the freewheeling switch element may be a FET, and the unidirectional conductible element may be a body diode of the FET. This way, a body diode of a FET can be used as the unidirectional conductible element.

Also preferably, the surge voltage prevention circuit of the invention may keep the switching element operating until a pulse drive signal to the switching element falls once an operation stoppage signal to the switching element is outputted, whereby the freewheeling switch element can be reliably turned off at any desirable timing.

Still also preferably, the surge voltage prevention circuit of the invention may then detect a falling edge of the pulse drive signal to the switching element to immediately interrupt the supply of the pulse drive signal to the switching element. Thus, the freewheeling switch element can be reliably turned off at such timing that the current flows in the direction in which the unidirectional conductible element conducts.

Alternatively, the present invention may be applied to a device wherein under light load or no load, a current flowing through the freewheeling switch element is turned from the reverse to the forward direction when the freewheeling switch element turns on, and then the freewheeling switch element is turned off when the current flows back to the reverse direction again. In this case, there may desirably be provided a delay circuit for turning off the freewheeling switch element at the timing that the forward current flows through the freewheeling switch element when the surge voltage prevention circuit detects a falling of the pulse drive signal to the switching element. With such delay circuit, the freewheeling switch element can be reliably turned off at desirable timings.

DETAILED DESCRIPTION OF THE INVENTION

Figure 4:
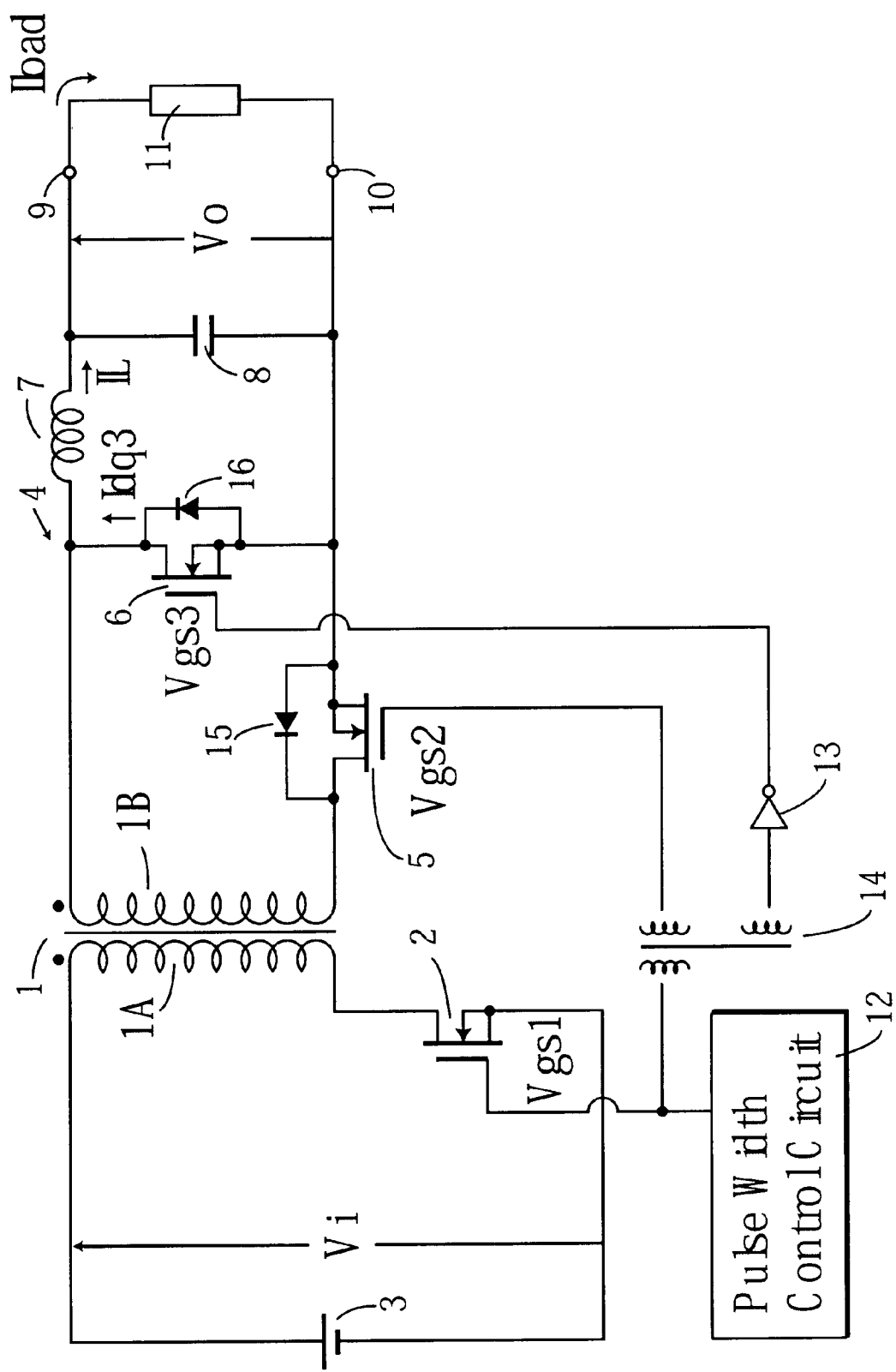
FIG. 4 is a circuit diagram of a conventional switching power supply.
Figure 5:
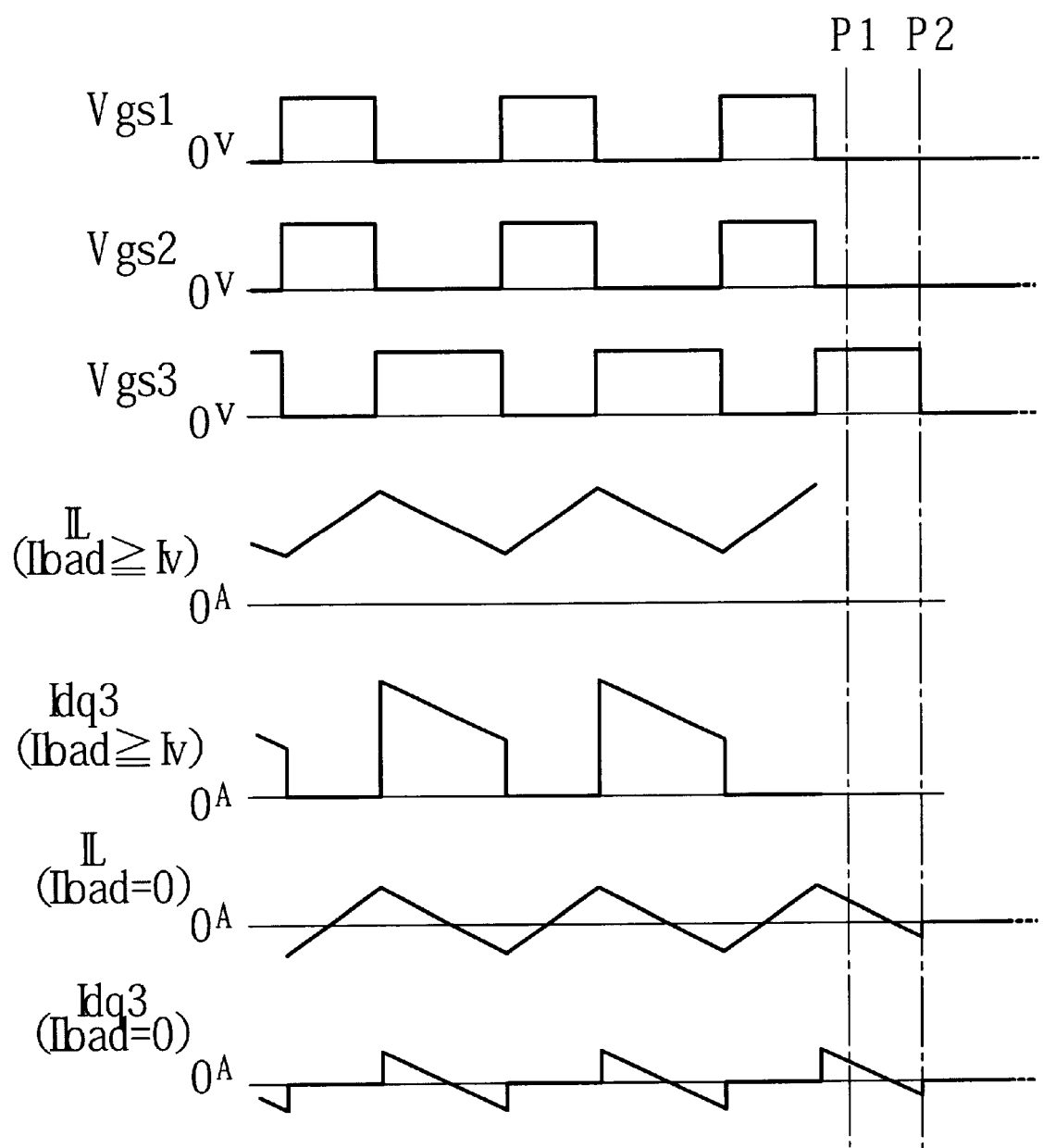
FIG. 5 is a waveform diagram showing waveforms in respective parts in accordance with the conventional one.

Hereunder is a detailed description of a preferable embodiment of the present invention with reference to the appended drawings. The same reference numerals are used for parts the same as those in FIG. 4 showing a conventional example and the common parts are not described in detail to avoid duplicate description.

Figure 1:
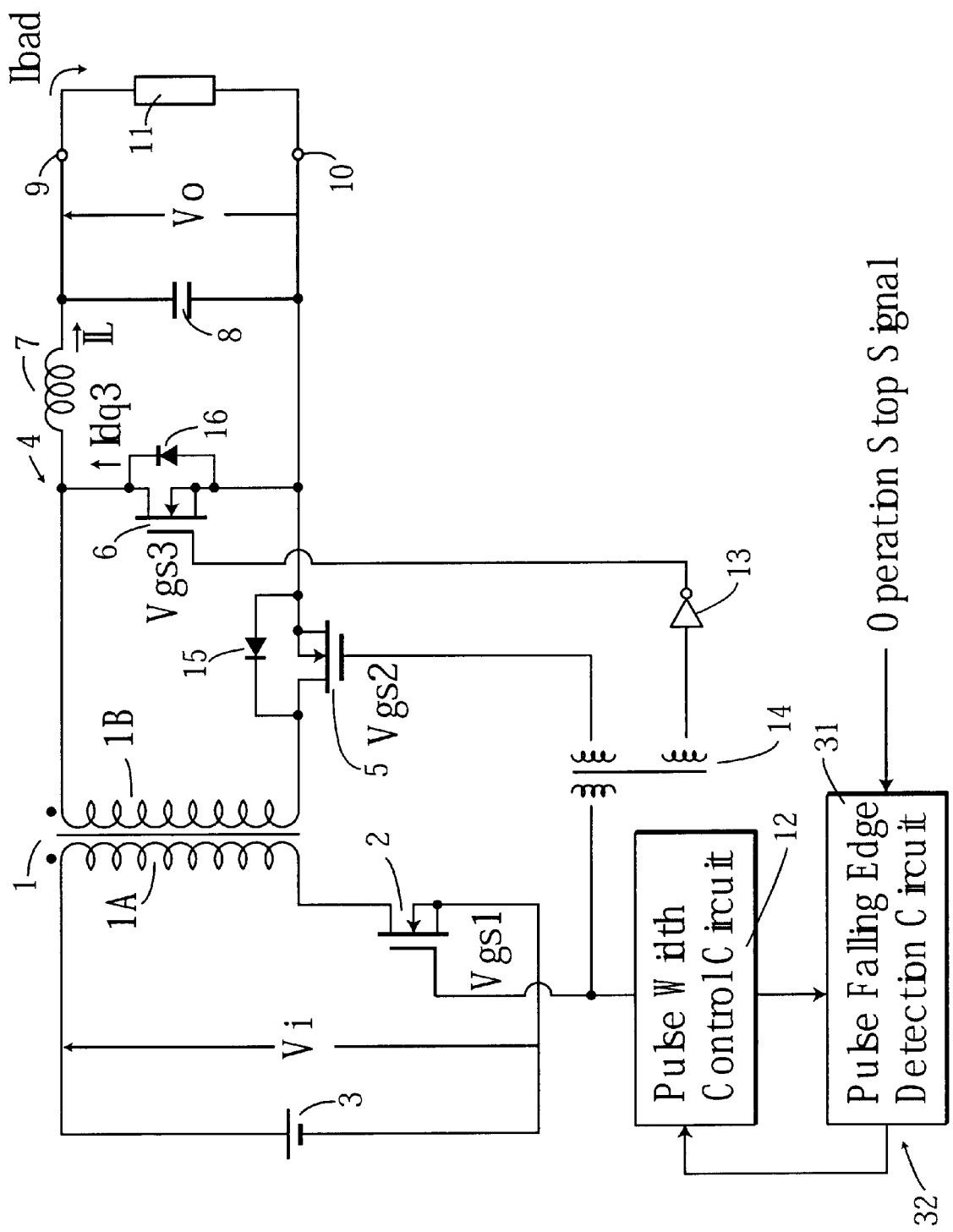
FIG. 1 is a circuit diagram of a switching power supply in accordance with a first embodiment of the present invention.
Figure 2:
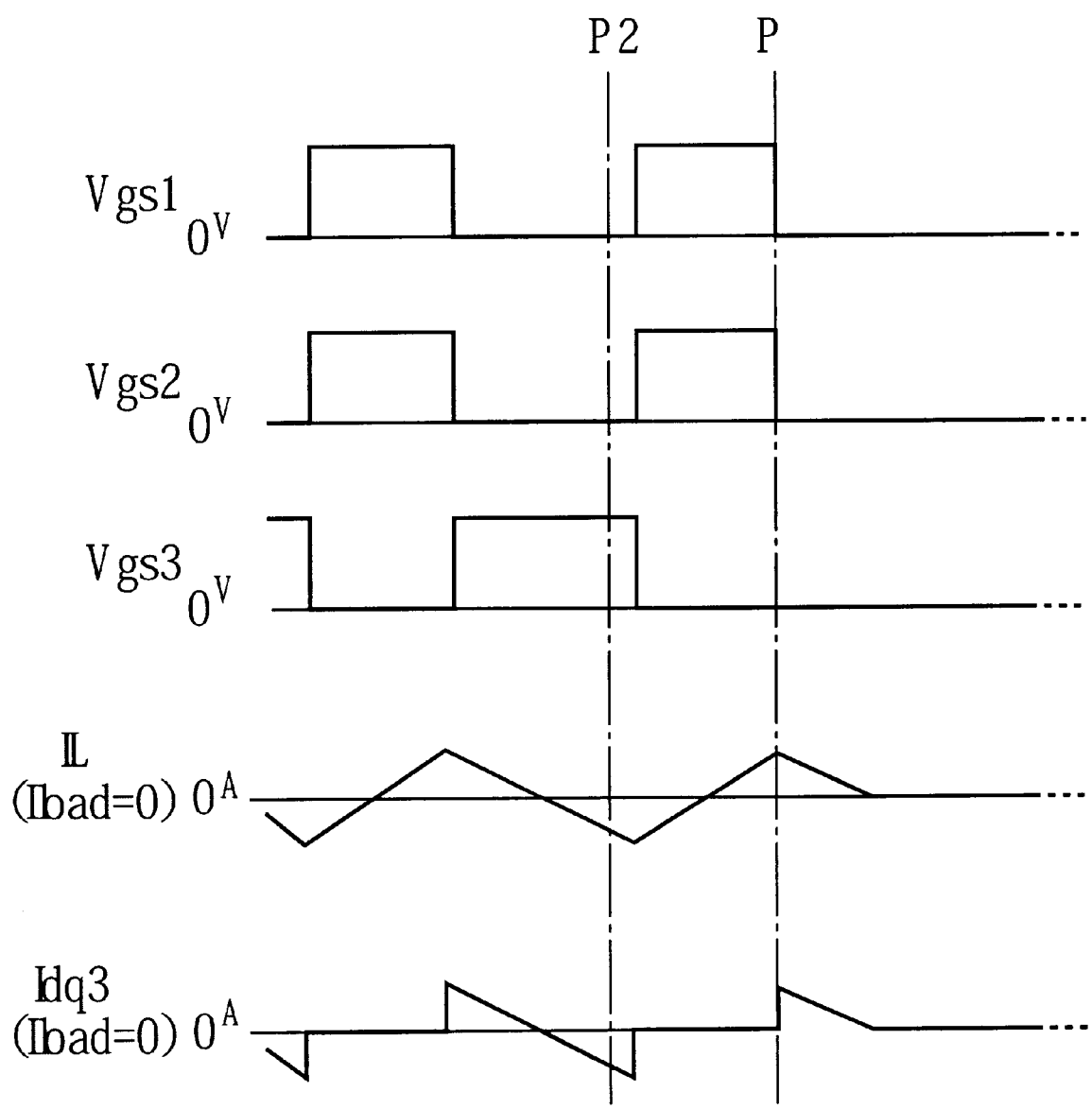
FIG. 2 is a waveform diagram showing waveforms in respective parts in accordance with the first embodiment of the present invention.

FIG. 1 and FIG. 2 are circuit diagrams showing an embodiment of the present invention applied specifically to a forward converter type switching power supply. The present embodiment differs from the prior art shown in FIG. 4 in that the power supply shown in a circuit diagram of FIG. 1 includes a pulse falling edge detection circuit 31 which detects a falling edge of pulse drive signal that is fed from a pulse width control circuit 12 to the switching element 2, when the operation stoppage signal for stopping the operation of the switching element 2 is outputted, and then turns off the switching element 2, a rectifying MOSFET 5 and a freewheeling MOSFET 6 when the falling edge of the pulse is detected. That is, in this case, the pulse width control circuit 12 and the pulse falling edge detection circuit 31 function as a surge voltage prevention circuit which, in response to the operation stoppage signal to the switching element 2, detects the moment when a current begins to flow to a direction in which a body diode 16 of the freewheeling MOSFET 6 conducts, as the falling edge of pulse drive signal that is fed to the switching element 2, and turns off the freewheeling MOSFET 6 at this timing.

Next is a description of operation of the abovementioned topology with reference to the waveform diagram in FIG. 2. During a normal operation of the switching element 2, as no operation stoppage signal is outputted, the pulse falling edge detection circuit exerts no influence on the pulse width control circuit 12 so that the same operation as that of the prior art in FIG. 4 is performed. That is, when the switching element 2 turns on by a ON pulse signal from the pulse width control circuit 12, the ON pulse signal is directly fed to a gate of the rectifying MOSFET 5 so that the rectifying MOSFET 5 turns on while the freewheeling MOSFET 6 turns off by a reverse OFF pulse signal. Thus, energy is supplied from the secondary winding 1 B of the transformer 1 to the choke coil 7 and the load 11 via the rectifying MOSFET 5. Soon after, when the switching element 2 turns off by OFF pulse signal from the pulse width control circuit 12, the rectifying MOSFET 5, in turn, turns off while the freewheeling MOSFET 6 turns on so that energy already stored in the choke coil 7 is supplied to the load 11 via the freewheeling MOSFET 6.

With a series of operation as abovementioned, as during the time period of ON state of the switching element 2, energy is stored in the choke coil 7 while during the time period of OFF state of the switching element 2 energy stored in the choke coil 7 is discharged, the choke current IL fluctuates repeatedly up and down the level of the load current 1 load at the time of normal load in the unchanging direction. Further, at that time, the freewheeling MOSFET 6 becomes nonconductive during the time period of ON state of the switching element 2 so that the drain current Idq3 becomes zero while it conducts during the time period of OFF state of the switching element 2 so that the same waveform as the aforementioned choke current IL appears in the drain current.

On the other hand, under no load or light load, the choke current IL flowing through the choke coil 7 flows varying its flowing direction forward and inversely. Accordingly, the drain current Idq3 of the freewheeling MOSFET 6 during the time period of OFF state of the switching element 2 flows from the source to the drain at first. However, soon after, the drain current Idq3 decreases linearly to zero and thereafter changes its flowing direction so as to flow from the drain to the source, increasing linearly. Then, when the switching element 2 turns on so that the free wheeling MOSFET 6 itself turns off, the drain current Idq3 of the freewheeling MOSFET 6 is kept zero until the switching element 2 turns off next.

As described above, under no load or light load, when, for example the DC input voltage Vi gets off or an OFF signal is supplied to the ON/OFF control terminals so that the operation stoppage signal is outputted, the operation stoppage signal is supplied not directly to the pulse width control circuit 12 but to the pulse falling edge detection circuit 31. For example, as shown in FIG. 2, if the operation stoppage signal is outputted when the drain current Idq3 of the freewheeling MOSFET 6 flows in the direction from the drain to the source (see time P2 in FIG. 2), the pulse falling edge detection circuit 31 defers the supply of the operation stoppage signal to the pulse width control circuit 12 until the pulse drive signal from the pulse width control circuit 12 to the switching element 2 falls next, while as soon as it detects the falling edge of the pulse drive signal, it supplies the operation stoppage signal to the pulse width control circuit 12. As the result, the supply of the pulse drive signal from the pulse width control circuit 12 is interrupted so that the switching element 2, the rectifying MOSFET 5 and the freewheeling MOSFET 6 all turn off. However, as the energy stored in the choke coil 7 is allowed to flow through the body diode 16 of the freewheeling MOSFET 6, surge voltage does not develop between the drain and the source of the freewheeling MOSFET 6.

As is apparent from the foregoing, a switching power supply according to the present embodiment is such that energy is supplied to the smoothing choke coil 7 from the secondary winding 1B of the transformer 1 via the rectifying MOSFET 5 when the switching element 2 turns on, while the energy stored in the choke coil 7 is fed to the load 11 side through the freewheeling switch element when the switching element 2 turns off, in which at least the freewheeling switch element includes the freewheeling MOSFET 6 which operates synchronously with the switching element 2, wherein the switching power supply of the invention includes the surge voltage prevention circuit 32 which detects the timing for the current to flow in a direction in which the body diode 16 conducts when the operation stoppage signal to the switching element 2 is outputted, and then turns off the freewheeling MOSFET 6 at this timing.

Thus, even if the operation stoppage signal to the switching element 2 is outputted at any timing, yet the surge voltage prevention circuit 32 allows the freewheeling MOSFET 6 to be turned off at such timing that the current flows in the direction in which the body diode 16 conducts, whereby the current following the discharge of the energy stored in the choke coil 7 is allowed to flow through the body diode 16 of the rectifying MOSFET 6. Accordingly, surge voltage likely to be developed when the operation stoppage signal is outputted under light load or no load, can be prevented without fail.

Figure 3:
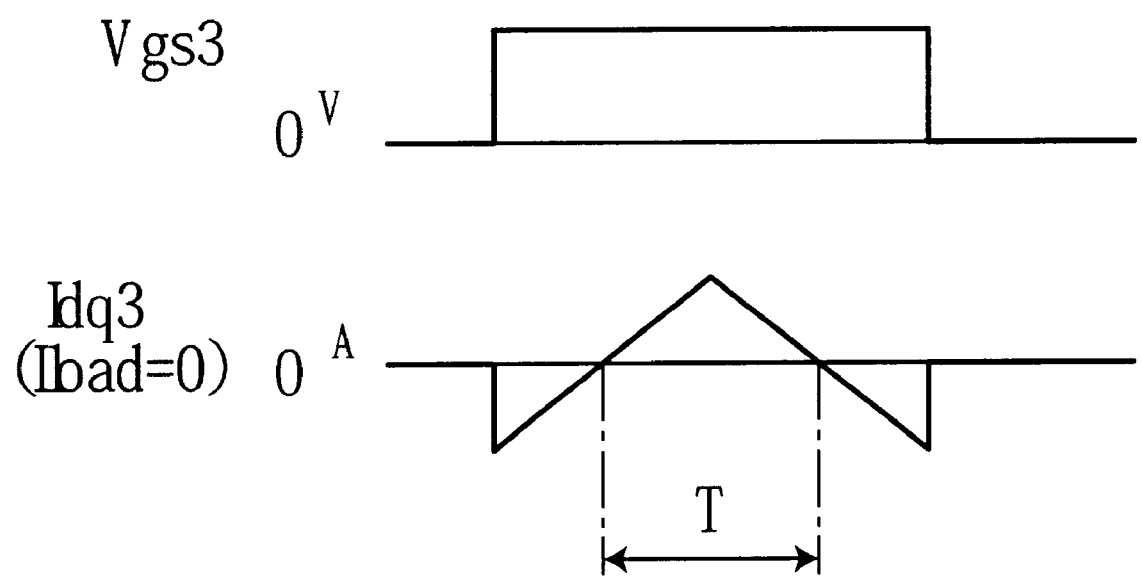
FIG. 3 also is a waveform diagram showing waveforms in respective parts in accordance with a modified embodiment of the present invention.

Although the forward converter type switching power supply is described in the foregoing embodiment, the invention may be applied to any other suitable type of switching power supply. For example, referring to FIG. 3 showing the voltage Vgs3 between the gate and the source of the freewheeling MOSFET 6 provided in a full bridge type switching power supply and the drain current Idq3 flowing through the freewheeling MOSFET 6 under light load or no load, the drain current Idq3 decreases linearly, flowing from the drain to the source at first when the freewheeling MOSFET 6 turns on, and then it changes the flowing direction from the source to the drain so that it increases and decreases linearly until it becomes zero, and when it increases linearly, flowing from the drain to the source again, the freewheeling MOSFET 6 turns off to make the value of the current zero. Therefore, like the above-discussed forward converter type, a surge voltage would be developed across the freewheeling MOSFET 6 if the operation stoppage signal is supplied to the pulse width control circuit 12 at such timing that the freewheeling MOSFET 6 turns on.

In that case, for example, a delay circuit serving as the surge voltage prevention circuit 32 may be provided between the inverter 13 and the gate of the freewheeling MOSFET 6 in order to turn off the freewheeling MOSFET 6 during the period (see the period T shown in FIG. 3) that the drain current Idq3 is flowing from the source to the drain of the freewheeling MOSFET 6. With the structure thus arranged, the freewheeling MOSFET 6 is turned off at such timing that the current flows in the direction in which the body diode 16 of the freewheeling MOSFET 6 conducts at no matter what timing the operation stoppage signal to the switching element 2 is outputted. Accordingly, the current following the discharge of the energy from the choke coil 7 is allowed to flow though the body diode 16 of the freewheeling MOSFET 6 so that the development of surge voltage can be reliably prevented.

The present invention should not be limited to the foregoing embodiments, but various modifications thereof are possible. For example, although MOSFET is used as a rectifying element in the foregoing embodiments, it may be replaced by IGBT, bipolar transistor or combination of them with rectifying diodes. It should be noted that the present invention may be applied to a variety of switching power supplies other than the forward converter type or full-bridge type switching power supply in the foregoing embodiment.

What is claimed is:

1. A switching power supply in which energy is supplied to a smoothing choke coil from a secondary winding of a transformer via a rectifier element when a switching element turns on, while the energy stored in the choke coil is fed to a load through a freewheeling element when the switching element turns off, in which at least said freewheeling element includes a freewheeling switch element which operates synchronously with said switching element, said the switching power supply comprising:

an unidirectional conductible element which is connected in parallel with reverse polarity across said freewheeling switch element; and a surge voltage prevention circuit which detects a timing for a current to flow in a direction in which said unidirectional conductible element conducts by detecting a falling edge of a pulse drive signal fed to said switching element when an operation stoppage signal to said switching element is outputted, and then turns off the freewheeling switch element at this timing.

2. A switching power supply according to claim 1, wherein said surge voltage prevention circuit keeps said switching element operating until a pulse drive signal to said switching element falls next when the operation stoppage signal to said switching element is outputted.

3. A switching power supply according to claim 2, wherein said surge voltage prevention circuit then detects a falling edge of the pulse drive signal to said switching element so as to immediately interrupt the supply of the pulse drive signal to the switching element.

4. A switching power supply according to claim 1, wherein said freewheeling switch element comprises a FET while said unidirectional conductible element comprises a body diode of this FET.

5. A switching power supply according to claim 4, wherein if the operation stoppage signal to said switching element is outputted, said surge voltage prevention circuit keeps said switching element operating until a pulse drive signal to the switching element falls next.

6. A switching power supply according to claim 5, wherein said surge voltage prevention circuit then detects a falling edge of the pulse drive signal to said switching element so as to immediately interrupt the supply of the pulse drive signal to the switching element.

7. A switching power supply according to claim 1, wherein if said freewheeling switch element turns on under light load or no load, a current flowing through this freewheeling switch element is turned from a reverse to a forward direction, and then said freewheeling switch element turns off when the current flows back to the reverse direction again.

8. A switching power supply according to claim 7, wherein if the operation stoppage signal to said switching element is outputted, said surge voltage prevention circuit keeps said switching element operating until a pulse drive signal to the switching element falls next.

9. A switching power supply according to claim 8, wherein said surge voltage prevention circuit comprises a delay circuit, said delay circuit turning off the freewheeling switch element at such timing that a forward current flows through the freewheeling switch element when said surge voltage prevention circuit detects a fall of the pulse drive signal to the switching element next.

10. A switching power supply according to claim 7, wherein said freewheeling switch element comprises a FET while said unidirectional conductible element comprises a body diode of this FET.

11. A switching power supply according to claim 10, wherein if the operation stoppage signal to said switching element is outputted, said surge voltage prevention circuit keeps said switching element operating until a pulse drive signal to the switching element falls next.

12. A switching power supply according to claim 11, wherein said surge voltage prevention circuit comprises a delay circuit, said delay circuit turning off the freewheeling switch element at such timing that a forward current flows through the freewheeling switch element when said surge voltage prevention circuit detects a fall of the pulse drive signal to the switching element next.

* * * * *